F. H. MIDDLETON.
FREEZER.
APPLICATION FILED JAN. 10, 1918.
1,279,570.
Patented Sept. 24, 1918.
2 SHEETS—SHEET 2.
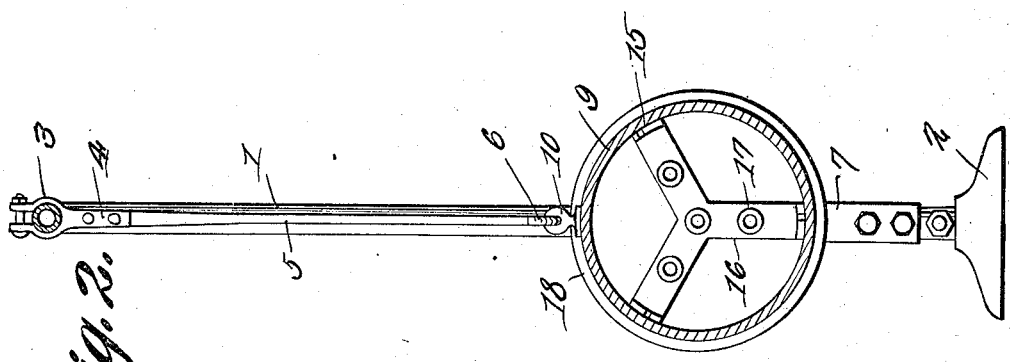
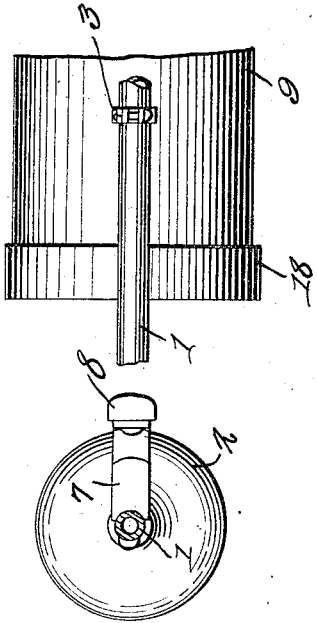
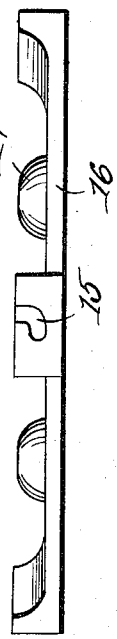
F. H. Middleton
Inventor,
Witness
by Casnow & Co.
Attorneys.

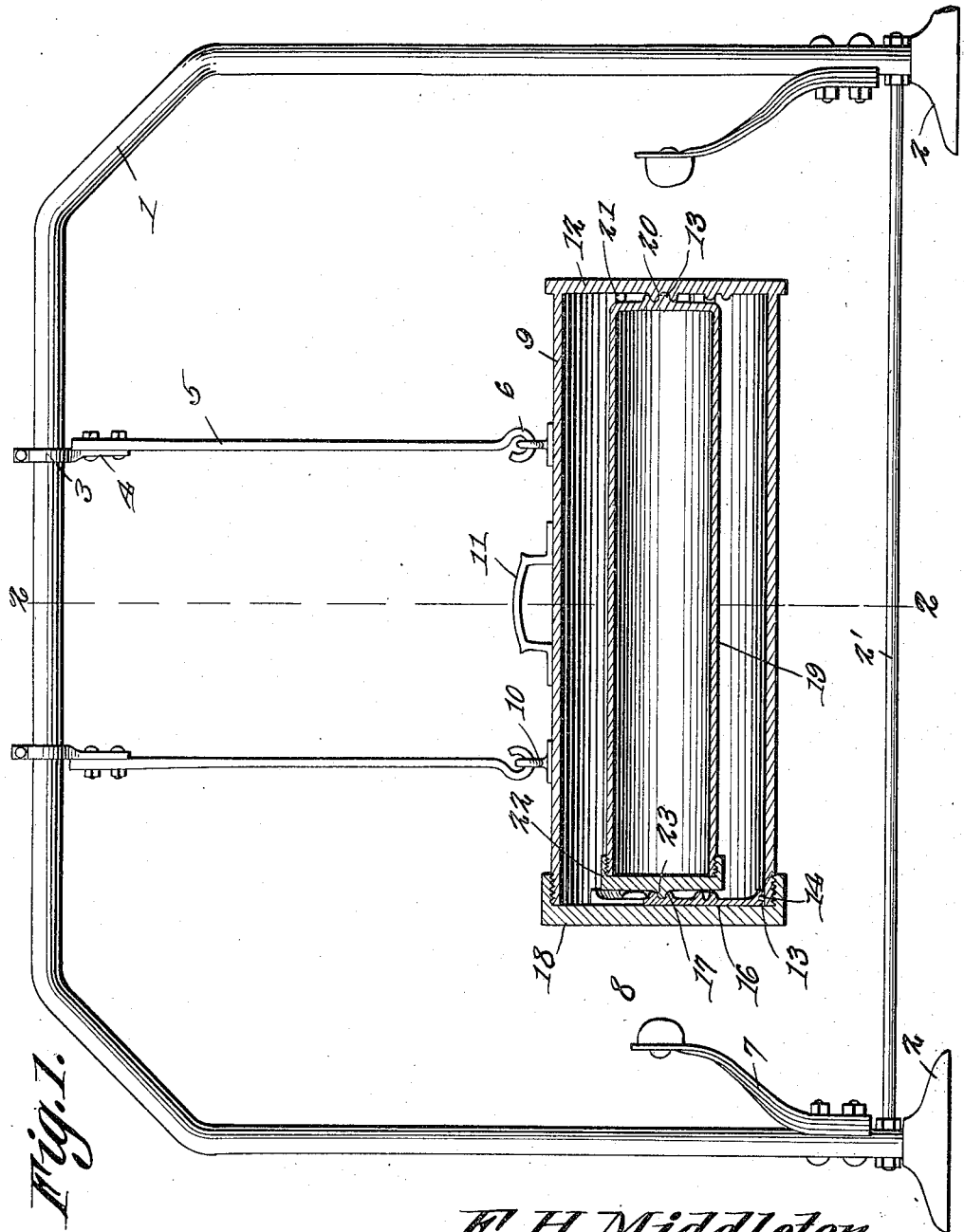

UNITED STATES PATENT OFFICE.

FRED H. MIDDLETON, OF CLARKSVILLE, TENNESSEE, ASSIGNOR OF ONE-HALF TO A. R. MANN, OF CLARKSVILLE, TENNESSEE.

FREEZER.

1,279,570.  Specification of Letters Patent.   Patented Sept. 24, 1918.

Application filed January 10, 1918. Serial No. 211,232.

*To all whom it may concern:*

Be it known that I, FRED H. MIDDLETON, a citizen of the United States, residing at Clarksville, in the county of Montgomery and State of Tennessee, have invented a new and useful Freezer, of which the following is a specification.

The subject of this invention is a freezer, and the objects of the invention are, first, to produce a device for the purpose of easily and rapidly freezing creams, custards, sherbets, and the like and packing them in the containers for future use, second, to provide an easy means for agitating the substance to be frozen, third, to provide means for freezing different substances separately at the same time, fourth, to provide a simple, durable, and efficient freezer.

With the foregoing and other objects in view which will appear as the description proceeds, the invention resides in the combination and arrangement of parts and in the details of construction hereinafter described and claimed, it being understood that changes in the precise embodiment of the invention herein described can be made within the scope of what is claimed without departing from the spirit of the invention.

A practial embodiment of the invention is shown in the accompanying drawings, wherein:—

Figure 1 is a view in side elevation, partly in section, of a freezer constructed in accordance with the invention;

Fig. 2 is a cross section on the line 2—2 of Fig. 1;

Fig. 3 is a fragmentary detail plan view showing the split collar and the bumper spring;

Fig. 4 is a detail view in elevation of the retainer.

Referring to the drawings by numerals of reference:—

In carrying out the invention there is provided a support which is, by preference, a bail like bar 1 of metallic tubing or other suitable material. The bar 1 is supported on feet or blocks 2 and may have its base strengthened by the tie rod 2'.

Spaced split collars 3—3 encircle the horizontally disposed portion of the bar 1 and are clamped thereon by bolts or otherwise. Each collar is provided with a depending lug 4 to which is secured by rivets or otherwise a depending spring 5, at the lower end of which is formed a hook 6. A bumper spring 7 is secured to each leg of the bail like support 1, and near the foot thereof, and these springs are preferably leaf springs as shown. To the upper free end of each spring is riveted or otherwise secured a bumper pad 8 which is adapted to contact the head of a tubular receptacle 9, when said receptacle is swung or oscillated.

The tubular receptacle 9 has suitably attached thereto eyes 10 which are adapted to receive the hooks 6 for the purpose of suspending the receptacle from the springs 5. A handle 11 may also be attached to the receptacle as an aid in handling the same. The receptacle is closed at one end by a permanent head 12 on the inner face of which sockets 13 are formed. The other end of the receptacle is opened and has inwardly projecting lugs 14 adapted to take into the slots 15, herein shown as bayonet sockets, which are formed in the ends of the arms of a retainer 16. The retainer is provided with sockets 17 which are counterparts of the sockets 13 formed in the head 12. The retainer is held in place and the receptacle closed by a screw cap 18 which is threaded on the end of the receptacle.

Within the receptacle 9 a number of containers 19 may be placed. Only one of these containers is shown herein so as to simplify the structure. Each container is of cylindrical formation and is headed at one end, and from the center of such head projects a boss 20 which is adapted to fit in a socket 13. A series of feet 21 may be spaced about the periphery of this head for the purpose of supporting the container when stood in a vertical position. The feet are spaced so as to allow the freezing mixture free access to the bottom of the container. The other or opened end of the container is closed by a screw cap 22 which is threaded onto the container and which is provided with a central boss 23 adapted to fit into a socket 17 of the retainer 16.

In practice the containers 19 are filled with the material to be frozen and one or more, as may be desired, placed in the receptacle 9, each with its boss 20 fitted into a socket 13. The retainer 16 is then brought into place with a socket 17 receiving a boss 23. The freezing mixture is then placed in the receptacle; the screw cap 18 threaded on; and the receptacle hung upon the hooks 6. The device may now be oscillated back and forth, the suspending springs 5 and bumper springs 7 aiding in the movement, until the contents of the containers is thoroughly frozen. The receptacle may then be removed from the hooks and packed in the usual way.

It will thus be seen that creams of different flavor, and materials of different composition may be frozen at one operation and yet kept entirely separate and distinct.

Having thus described the invention, what is claimed as new and sought by Letters Patent, is:—

1. A freezer including a receptacle, one end of said receptacle provided with sockets, a retainer provided with sockets detachably secured in the other end of the receptacle, containers having bosses fitting in the sockets held within the receptacle, and a screw cap for closing the receptacle.

2. A freezer including a receptacle, one end of said receptacle provided with sockets, a retainer provided with sockets detachably secured in the other end of the receptacle, containers within the receptacle and having bosses fitting in the sockets, feet spaced about the normally closed ends of the containers, and a cap for closing the receptacle.

In testimony that I claim the foregoing as my own, I have hereto affixed my signature in the presence of two witnesses.

FRED H. MIDDLETON.

Witnesses:
HERBERT W. NICHOLS,
T. T. GILBERT.

Copies of this patent may be obtained for five cents each, by addressing the "Commissioner of Patents. Washington, D. C."